(12) United States Patent
Mukerji et al.

(10) Patent No.: US 7,826,487 B1
(45) Date of Patent: Nov. 2, 2010

(54) COALESCING ACKNOWLEDGEMENT RESPONSES TO IMPROVE NETWORK COMMUNICATIONS

(75) Inventors: Arindum Mukerji, Seattle, WA (US); Jesse Abraham Rothstein, Seattle, WA (US)

(73) Assignee: F5 Network, Inc, Seattle, WA (US)

( * ) Notice: Subject to any disclaimer, the term of this patent is extended or adjusted under 35 U.S.C. 154(b) by 821 days.

(21) Appl. No.: 11/150,361

(22) Filed: Jun. 9, 2005

Related U.S. Application Data

(60) Provisional application No. 60/678,970, filed on May 9, 2005.

(51) Int. Cl.
*H04J 3/18* (2006.01)
*H04L 12/28* (2006.01)
(52) U.S. Cl. .................... 370/477; 370/394
(58) Field of Classification Search ............. 370/273, 370/503, 389, 477, 394
See application file for complete search history.

(56) References Cited

U.S. PATENT DOCUMENTS

| | | | |
|---|---|---|---|
| 5,941,988 A | 8/1999 | Bhagwat et al. | |
| 5,978,845 A | 11/1999 | Reisacher | |
| 6,457,054 B1 * | 9/2002 | Bakshi | 709/227 |
| 6,549,516 B1 * | 4/2003 | Albert et al. | 370/236 |
| 6,700,871 B1 | 3/2004 | Harper et al. | |
| 6,820,133 B1 | 11/2004 | Grove et al. | |
| 7,324,525 B2 * | 1/2008 | Fuhs et al. | 370/395.7 |
| 2002/0143955 A1 | 10/2002 | Shimada et al. | |
| 2004/0111635 A1 * | 6/2004 | Boivie et al. | 713/201 |
| 2004/0249948 A1 | 12/2004 | Sethi et al. | |
| 2005/0141545 A1 * | 6/2005 | Fein et al. | 370/445 |
| 2005/0198350 A1 * | 9/2005 | Tan et al. | 709/232 |
| 2006/0029016 A1 * | 2/2006 | Peles | 370/328 |
| 2006/0227811 A1 * | 10/2006 | Hussain et al. | 370/503 |

OTHER PUBLICATIONS

"Transmission Control Protocol", for DARPA, ISI, Univ. S. Cal., Sep. 1981, pp. 1-82, http://ietf.org/rfc/rfc0793.txt?number=793.
Braden, R., "Extending TCP for Transactions—Concepts", RFC, Nov. 1992, pp. 1-3, http://ietf.org/rfc/rfc1379txt?number=1379.

(Continued)

*Primary Examiner*—Derrick W Ferris
*Assistant Examiner*—Angel Brockman
(74) *Attorney, Agent, or Firm*—Mathew M. Gaffney; Frommer Lawrence & Haug LLP

(57) ABSTRACT

A system, apparatus, and method are directed to managing network communications by, in part, reducing a number of packets between a client and a server communicating through another device, such as a traffic management device (TMD). The invention reduces the number of packets communicated, in part, by coalescing acknowledgements (ACKs) and/or finish (FIN) flags into another packet. In one embodiment, if the client provides a substantially complete request for the server, an ACK to the request may be coalesced into a corresponding response from the server. When another request is to be provided to the server, within about half of the minimum retransmission timeout, an ACK to the prior response may be coalesced into a subsequent request to the server. Packet reduction may also be achieved by stretching a packet to insert additional data when the insertion maintains a packet size that is within a negotiated maximum segment size (MSS).

56 Claims, 6 Drawing Sheets

OTHER PUBLICATIONS

Stevens, W., "TCP Slow Start, Congestion Avoidance, Fast Retransmit, and Fast Recovery Algorithms", RFC, Jan. 1997, pp. 1-6, http://ietf.org/rfc/rfc2001.txt?number=2001.

Bernstein, D.J., "SYN cookies", pp. 1-3, http://cr.yp.to/syncookies.html.

Lemon, Jonathan, "Resisting SYN flood DoS attacks with a SYN cache", Dec. 4, 2001, pp. 1-4, BSDCon 2002 Paper, http://www.usenix.org/publications/library/proceedings/bsdcon02/full_papers/lemon/lemon_html/index.html.

Yemini, Yechiam, "Lecture 17: TCP (I)", Computer Science Department Columbia University, 1993-2003, pp. 1-9.

Yemini, Yechiam, "Transport Control Protocol", CS640, Computer Science Department Columbia University, pp. 1-18.

Welch, V., "A User's Guide to TCP Windows", Jun. 19, 1996, pp. 1-5, http://www.ncsa.uiuc.edu/People/vwelch/net_perf/tcp_windows.html.

Layer 4/7 Switching and Other Custom IP Traffic Processing using the NEPPI API, Bell Laboratories, Lucent Technologies, pp. 1-11.

Jeffrey C. Mogul, "the Case for Persistent-Connection HTTP", ACM SIGCOMM Computer Communication Review, Proceedings of the conference on applications, technologies, architectures, and protocols for computer communication, Oct. 1995, pp. 299-313, vol. 25 Issue 4.

Michael Rabinovich and Hua Wang, "DHTTP: An Efficient and Cache-Friendly Transfer Protocol for the Web", IEEE/ACM Transactions on Networking (TON), Dec. 2004, pp. 1007-1020, vol. 12 Issue 6.

"TCP—Transmission Control Protocol (TCP Fast Retransmit and Recover", pp. 1-5.

"EventStudio System Designer 2.5", pp. 1-3, http://www.eventhelix.com/EventStudio/.

* cited by examiner

US 7,826,487 B1

COALESCING ACKNOWLEDGEMENT RESPONSES TO IMPROVE NETWORK COMMUNICATIONS

CROSS-REFERENCE TO RELATED APPLICATIONS

The present application claims priority from provisional application Ser. No. 60/678,970 entitled "Coalescing Acknowledgement Responses to Improve Network Communications," filed on May 9, 2005, which is further hereby incorporated within.

FIELD OF THE INVENTION

The present invention relates generally to network communications, and more particularly, but not exclusively, to a system and method for managing network communications by, in part, reducing a number of packets communicated between networked devices.

BACKGROUND OF THE INVENTION

According to some studies, the volume of information over a network, such as the Internet, is expected to more than triple over the next three years. Data and content is likely to remain the largest percentage of Internet traffic, with the majority of this information being dynamic. Issues of concern with Internet traffic include business to consumer response and order times, the time required to deliver business information to a traveler using a wireless device, and the search for and request of rich media such as music, videos, and so forth. Thus, not surprisingly, a major complaint among Internet users is a lack of speed. Additionally, users' complaints often center on how long it takes to send a web browser request and to receive a response at their computing device using such protocols as the HyperText Transfer Protocol (HTTP). The amount of Internet traffic and the amount of processing by network devices are also areas of concern. Such issues may further arise where a network device resides between the requesting client and a responding server device. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
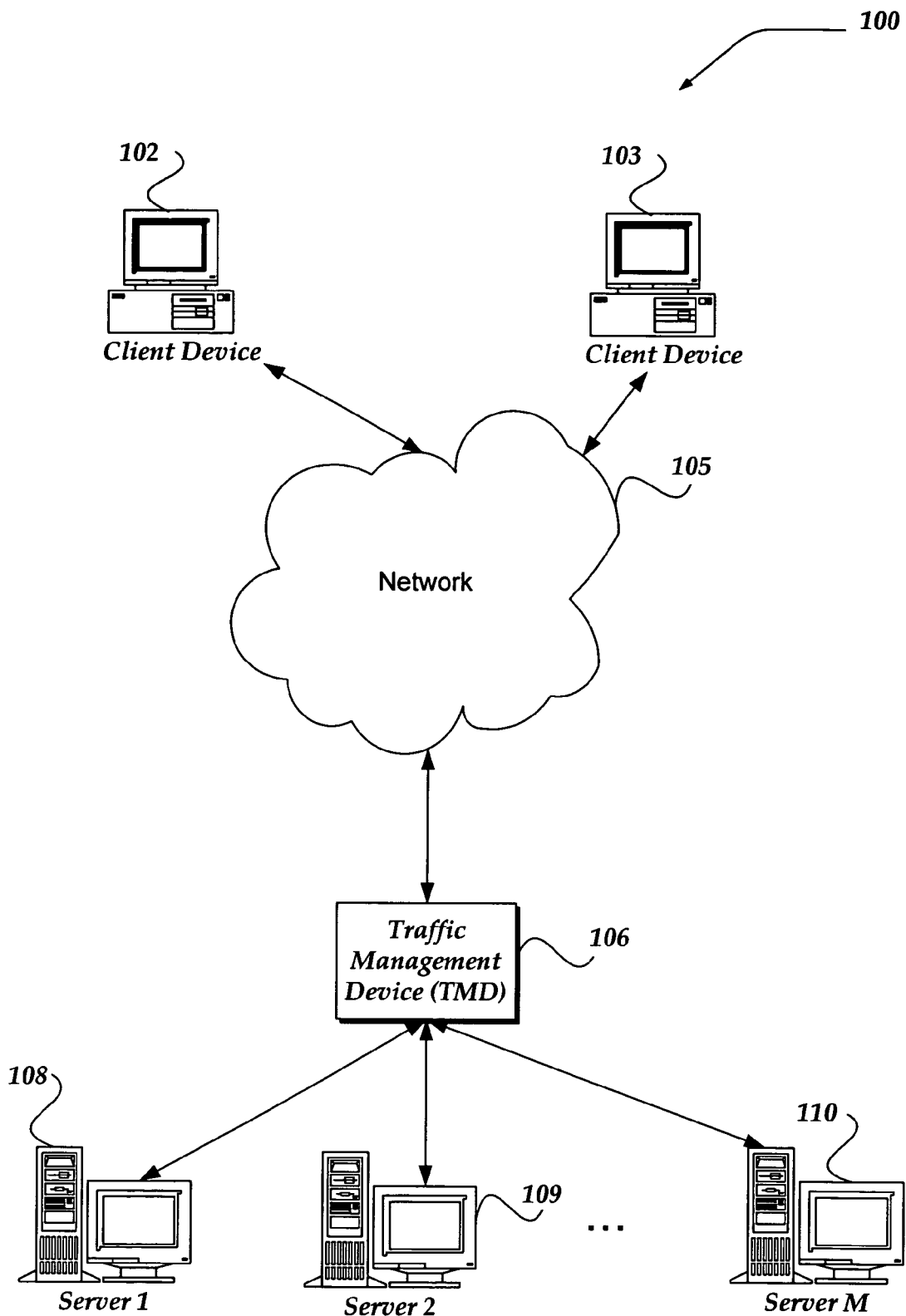
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise.

The phrase "in one embodiment" as used herein does not necessarily refer to the same embodiment, though it may.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

In addition, throughout the specification, the meaning of "a," "an," and "the" include plural references. The meaning of "in" includes "in" and "on."

Briefly stated, the present invention is directed towards a system, method, and apparatus for improving network communications by, in part, reducing a number of packets between a client and a server communicating through another device, such as a traffic management device (TMD). The invention reduces the number of packets communicated, in part, by coalescing (or combining) such protocol signals as acknowledgements (ACKs) and/or finish (FIN) flags into another packet. The invention also reduces packets by stretching packets to accommodate additional information, rather than providing the additional information in another packet over the network. It should be understood that coalescing an ACK, FIN, or the like, into a packet can be implemented in any of a number of ways, including changing bits in the packet, making a copy of the packet with appropriate fields changed, or the like.

Thus, in one embodiment, the TMD may initially parse a client request prior to ACKing the request from the client. If the request is substantially complete, rather than providing an ACK in a separate packet to the request from the TMD, the ACK to the request may be coalesced into a corresponding response from the server. In one embodiment, the ACK that is to be coalesced is generated by the server to acknowledge receipt of the request, and is delayed by the TMD to be coalesced into the response. Moreover, the ACK from the TMD acknowledging receipt of the request from the client may be suppressed, dropped, or the like. In another embodiment, the ACK from the TMD may be coalesced into the response from the server, and the ACK from the server may be dropped.

When another request is provided to the server through the TMD within a specified time, an ACK to the prior response may be coalesced into the other request to the server. The specified time period can be configured by a user or dynamically determined, or can be a combination of both. In one embodiment, the specified time is based on a minimum retransmission timeout period. In one embodiment, the ACK to be coalesced may be the ACK received from the client in response to the receipt of the prior request. In another embodiment, the ACK to be coalesced might be an ACK generated by the TMD in response to having received the prior request.

Network sessions may also be closed using a substantially similar coalescing mechanism for FIN requests. Thus, in one embodiment, a FIN flag may be coalesced into a last segment of a response from a server, thereby further reducing packets over the network in a non-persistent client connection. In addition, additional packet reduction may be achieved by stretching a request, or a response packet to insert additional information when the insertion maintains a packet size that is within a negotiated maximum segment size (MSS).

In one embodiment, the packet reduction mechanisms are employed with HTTP over Transmission Control Protocol (TCP). However, the invention is not limited to HTTP over TCP, and other protocols that employ acknowledgements and/or similar protocol signals may also benefit from the invention.

It is further noted that one embodiment of a use of ACK, FIN, and SYNchronization (SYN) flags is described in Request for Comments (RFC) 793 (available at http://ietforg/rfc/rfc0793.txt?number=793), which is hereby incorporated by reference. However, the invention may also employ other protocol signaling without departing from the scope or spirit of the invention.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-103, network 105, traffic management device (TMD) 106, and servers 108-110. Client devices 102-103 are in communication with TMD 106 through network 105. TMD 106 is in further communication with servers 108-110.

Generally, client devices 102-103 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-103 may also include other computing devices, such as personal computers, multiprocessor systems, microprocessor-based or programmable consumer electronics, network PCs, and the like. As such, client devices 102-103 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client devices 102-103 also may include at least one client application that is configured to receive content from another computing device. The client application may include a capability to provide and receive textual content, graphical content, audio content, alerts, messages, and the like. Moreover, client devices 102-103 may be further configured to communicate a message, such as through a Short Message Service (SMS), Multimedia Message Service (MMS), instant messaging (IM), interne relay chat (IRC), mIRC, Jabber, and the like, between another computing device, and the like.

In one embodiment, client devices 102-103 may include sites where an end-user operates the computing device to make requests for data and/or services from other computers on the network. Often, the requested data resides in computing devices such as servers 108-110. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, client devices 108-110 are computing devices that are not operated by an end-user.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices, such as remote device 106 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TMD 106 is described in more detail below in conjunction with FIG. 2. Briefly however, TMD 106 includes virtually any device that manages network traffic. Such devices include, for example, routers, proxies, firewalls, load balancers, cache devices, gateways, devices that perform network address translation (NATs), port translations, sequence translations, or the like, any combination of the preceding devices, and the like. Thus, in one embodiment, TMD 106 may inspect incoming network packets, and may perform an address translation, port translation, a packet sequence translation, and the like, and route the network packet based, at least in part, on the packet inspection.

In one embodiment, TMD 106 may perform a packet-by-packet content switching decision for client-side requests. Thus, TMD 106 may, for example, control the flow of data packets delivered to and forwarded from a server, such as servers 108-110. TMD 106 may direct a request to a particular server based on network traffic, network topology, capacity of a server, content requested, and a host of other traffic distribution mechanisms. TMD 106 may receive packets from and transmit packets to network 105, the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as web browsing, email, telephony, streaming multimedia and other traffic that is sent in packets.

TMD 106 may communicate with servers 108-110 and/or client devices 102-103 using any of a variety of network communication protocols, including TCP/IP, HTTP, as well as any of a variety of other connection-oriented protocols or the like. As such, TMD 106 may be configured to perform session setups, teardowns, sequencing, acknowledgements, keepalives, flow control, and the like, between itself and another network device. Moreover, TMD 106 may also be configured to manage connection aggregation wherein multiple client devices may be enabled to provide requests on a same server-side connection. TMD 106 may further open and manage a connection pool for connections with servers 108-110.

TMD 106 may be configured to coalesce an acknowledgement and/or a finish flag into a packet to reduce the number of packets communicated between a client device and a server device. TMD 106 may be further configured to insert packet information into a packet by stretching the packet to further reduce the number of packets over the network.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. The BIG-IP® family of traffic managers, by F5 Networks of Seattle, Wash., are examples of TMDs.

Although FIG. 1 illustrates TMD 106 communicating with client devices 102-103 through network 105, the invention is not so limited. For example, TMD 106 may also employ another network (not shown) with which to communicate with servers 108-110. Moreover, either network 105, and/or the other network (not shown) may represent the Internet, an intranet, or the like.

In addition, as illustrated TMD 106 might be considered to be residing on a same networking infrastructure as servers 108-110. Such networking infrastructure may include, for example, a local area network (LAN), or the like. However, the invention is not constrained to this architecture. For example, TMD 106 may also reside on a same networking infrastructure as client devices 102-103, without departing from the scope or spirit of the invention.

Servers 108-110 (1-M) may include any computing device capable of communicating packets with client devices 102-103 through TMD 106. Each packet may convey a piece of information. A packet may be sent for handshaking, e.g., to establish a connection or to acknowledge receipt of data. Thus, for example, the packet may include a synchronization (SYN) bit, an ACK bit, a FIN bit, or similar handshaking signals. The packet may include information such as a request, a response, or the like. Generally, packets received by servers 108-110 will be formatted according to TCP/IP, but they could also be formatted using another transport protocol, such as User Datagram Protocol (UDP), NETbeui, Stream Control Transmission Protocol (SCTP), token ring, and the like. Moreover, the packets may be communicated between servers 108-110, TMD 106, and client devices 102-103 employing HTTP, HTTPS, and the like.

In one embodiment, servers 108-110 are configured to operate as a website server. However, servers 108-110 are not limited to web servers, and may also operate as a messaging server, a File Transfer Protocol (FTP) server, a database server, a content server, and the like. Additionally, each of servers 108-110 may be configured to perform a different operation. Thus, for example, server 108 may be configured as a messaging server, while server 109 is configured as a database server. Moreover, while servers 108-110 may operate as other than a website, they may each still be enabled to receive an HTTP communication using TCP/IP, or the like.

Devices that may operate as servers 108-110 include personal computers desktop computers, multiprocessor systems, microprocessor-based or programmable consumer electronics, network PCs, servers, and the like.

Illustrative TMD Environment

Figure 2:
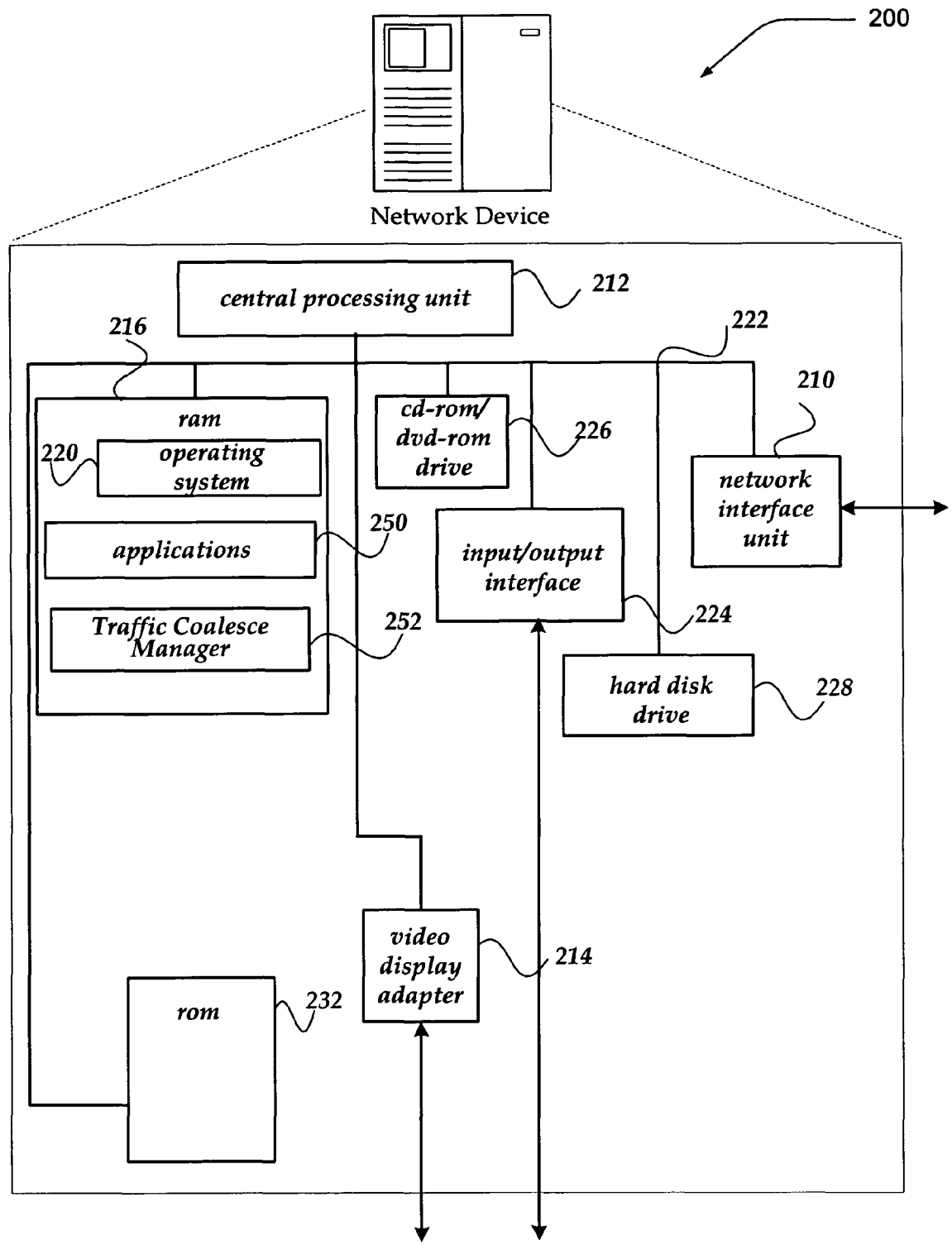
FIG. 2 shows one embodiment of a server device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed.

As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, filtering programs, traffic management programs, schedulers, calendars, database programs, word processing programs, HTTP programs, security programs, and so forth. Mass storage may further include applications such as traffic coalesce manager (TCM) 252.

TCM 252 may be configured to receive a request from a client and provide an acknowledgement to the request coalesced into a response from a server to reduce the number of packets over the network. TCM 252 may also coalesce an acknowledgement to the response into a subsequent request, to further reduce the number of packets. In one embodiment, TCM 252 may coalesce the acknowledgement to the response into a subsequent request from a different client that is associated with the prior request. During a teardown, or termination of a session, TCM 252 may also be configured to coalesce a finish (FIN) flag into a response to the client. In addition, TCM 252 may be further configured to insert packet information into a packet by stretching the packet, to further reduce the number of packets over the network. TCM 252 may employ processes substantially similar to those described below in conjunction with FIGS. 5-6 to perform at least some of these actions.

Although TCM 252 is illustrated as an application executing within RAM 216, the invention is not so constrained. As such, TCM 252 may also be implemented into hardware, or even combination of software and hardware, without departing from the scope or spirit of the invention.

Generalized Operation

Figure 3:
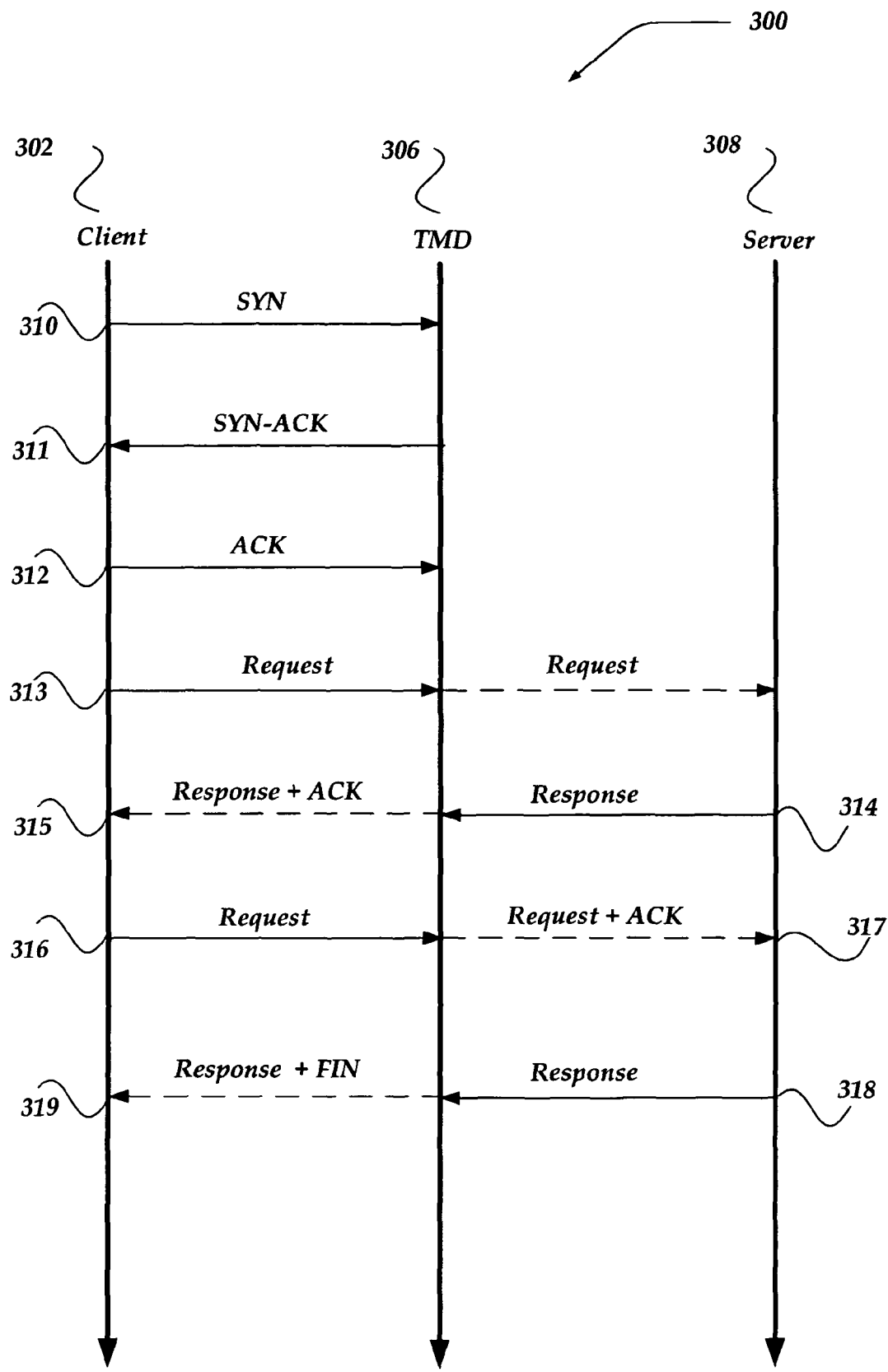
FIG. 3 illustrates a packet flow diagram generally showing one embodiment of network communications with coalesced protocol signals.

The operation of certain aspects of the invention will now be described with respect to FIGS. 3-6. FIG. 3 illustrates a packet flow diagram generally showing one embodiment of network communications with coalesced protocol signals with data. FIG. 3 may be used as an example of packet flows to assist in understanding process flow 500 of FIG. 5.

Packet flow 300 of FIG. 3 may include many more or less flows than those shown. The flows shown, however, are sufficient to disclose an illustrative embodiment for practicing the invention. As shown, time is represented as a vertical axis proceeding downwards. Client 302, TMD 306, and Server 308 are represented as providing various packets flows (310-319). Client 302 may represent, for example, a client device, such as client devices 102-103 of FIG. 1, while TMD 306 may represent TMD 106 and server 308 may represent any of servers 108-110 of FIG. 1.

As shown in FIG. 3, an end-user of client 302 may send a request for information that is to be handled by server 308. As such client 302 may setup a session employing a three-way handshake comprising sending synchronization (SYN) 310 to TMD 306, receiving synchronization-acknowledgement (SYN-ACK) 311 from TMD 306, and sending acknowledgement (ACK) 312 to TMD 306 indicating that client 302 has received TMD 306's SYN-ACK 311. Such three-way handshake may, in one embodiment, be accomplished by setting various bits within a TCP packet header, as described in more detail below in conjunction with FIG. 4. A successful completion of this three-way handshake typically results in at least three packets being communicated between client 302 and TMD 306.

Devices that receive SYN packets across a network may confront a security problem known as SYN flooding. In SYN flooding, an attacker sends numerous SYN packets to a device, typically with false source addresses, without completing the connections, thereby using up resources of the device. Techniques to defend against SYN flooding include a SYN cache and SYN cookies. These techniques are described in a paper titled "Resisting SYN flood DoS attacks with a SYN cache," by Jonathan Lemon, available at http://www.usenix.org/publications/library/proceedings/bsdcon02/full-_papers/lemon/lemon_html/. In the SYN cookies technique, a receiving device responds to a SYN packet by sending a server initial sequence number containing embedded data. In the SYN cache technique, the amount of resources consumed by embryonic connections is limited. Such embryonic connections include, for example, connections in a SYN-RECEIVED state. In one embodiment, TMD 306 may employ a SYN cookie technique when performing the three-way handshake with the client across a wide area network or other network where security may be a concern. In one embodiment, TMD 306 may employ a SYN cache technique when performing the three-way handshake.

Typically, although not required, TMD 306 may have initially communicated with server 308 to setup and maintain a connection pool of available network session connections. The connection pool may, in one embodiment, be established using a prefork command to create a number of connections, or the like, of a predetermined number of connections that may then be available to service client requests when they arrive. Maintaining connection pools, or the like, may reduce session setup time as well as the number of packets on the network. However, the invention is not constrained to employing connection pools, and virtually any mechanism may be employed to setup and maintain a session between TMD 306 and server 308 for use by client 302. Thus, if TMD 306 has not established a session with server 308 prior to setting up a session with client 302, it may do so, using a similar three-way handshake with server 308 upon setting up the client session.

The successful establishment of the sessions between client 302 and TMD 306 and between TMD 306 and server 308 enables client 302 to subsequently provide request 313 towards server 308. In one embodiment, TMD 306 may perform an inspection of the request. TMD 306 may determine whether the packet includes a complete request or whether the request is split across multiple packets. In one embodiment where the request includes an HTTP request for information, such determination may be made based, at least in part, upon a presence of a request terminator, including multiple carriage return/line feeds (CR/LF), or the like. If the request is complete, then TMD 306 may perform a content switch on request 313 and route it to a server, such as server 308. Server 308 may be selected from multiple servers using any of a variety of mechanisms, and criteria, including, but not limited, to those mechanisms described above. By routing the complete request, the invention may minimize any buffering of packets and thereby reduce potential latency.

In traditional TCP communications, TMD 306 provides an acknowledgement (ACK) to client 302 that it received request 313. However, the present invention defers the ACK to reduce the number of packets over the network. Thus, as shown in FIG. 3, when server 308 provides response 314, TMD 306 coalesces the ACK into response 314 and provides coalesced response 315 to client 302. Moreover, the invention may further coalesce an ACK to coalesced response 315 with subsequent request 316 to provide coalesced request 317 to server 308. Coalescing the ACK with subsequent request 316 may be performed when subsequent request 316 is received within a specified time period. In one embodiment, the specified time is based on a minimum retransmission timeout for a network session. In one embodiment, the specified time period is less than about fifty percent (50%) of the minimum retransmission timeout for a network session. In one embodiment, request 316 is from a different connection than request 313, and may be from a different client than the client sending request 313. Moreover, request 316 may also be from at different application layer protocol than request 313, whether or not request 316 is from the same, or different client as request 313.

Moreover, further packet reductions may be performed, as illustrated in FIG. 3, by coalescing a FIN flag into final response 315 to provide coalesced response 319 that may be configured to terminate the network session.

Figure 4:
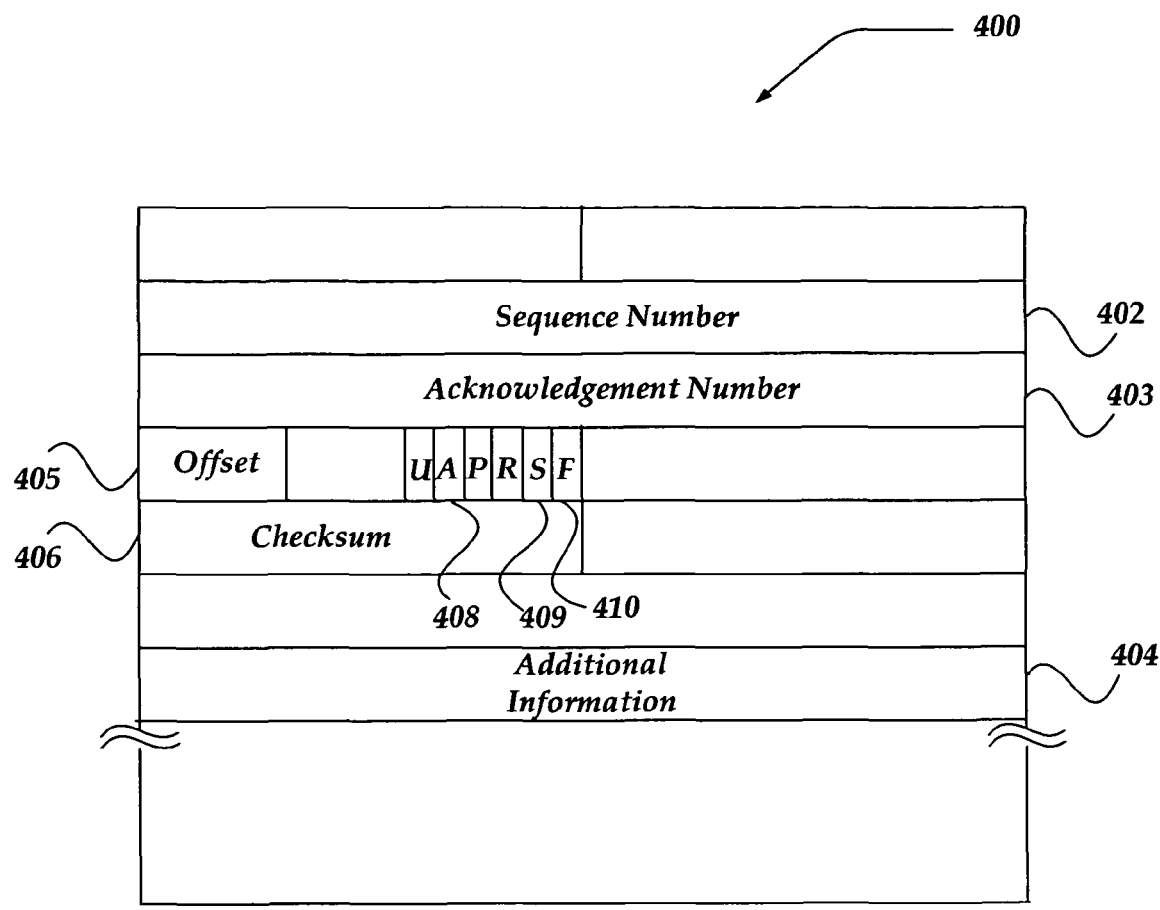
FIG. 4 illustrates a function block diagram showing one embodiment of a Transmission Control Protocol (TCP) header with packet stretching.

FIG. 4 illustrates a function block diagram showing one embodiment of a Transmission Control Protocol (TCP) header with packet stretching. One embodiment of an unstretched TCP header along with ACK, SYN, and FIN flags are described in more detail in RFC 793, identified above. Packet 400 may include many more or less components than those shown. The components shown, however, are sufficient to disclose an illustrative embodiment for practicing the invention.

Packet 400 as shown includes sequence number 402, acknowledgement number 403, additional information 404, offset 405, checksum 406, ACK bit 408, SYN bit 409, and FIN bit 410. ACK bit 408, SYN bit 409, and FIN bit 410, each which illustrate one example of control flags for use in communicating TCP protocol signaling. As described herein, a SYN-ACK may be generated by setting both ACK bit 408 and SYN bit 409 within packet 400.

Briefly, TCP communicates may employ sequencing to keep track of data. Thus, sequence number 402 may be employed to identify the data transmitted over the network. In one embodiment, sequence number 402 may identify a first byte within a datagram being sent.

Acknowledgement number 403 may include a value that identifies a next sequence value a device expects to receive from another device. Acknowledgement number 403 is typically expected to represent a previously sent sequence number 402 plus a length value. In one embodiment, acknowledgement number 403 represents an implied acknowledgement.

Offset 405 may indicate where a start of an upper-layer data following the TCP header begins, while checksum 406 represents a value that may be used to detect bit damage that might have occurred during a transmission of the packet over the network.

ACK bit 408 may include one or more bits that might provide recognition of receipt of a previously received packet. SYN bit 409 may include one or more bits that may be employed to establish a session by, at least in part, synchronizing sequence numbers, or the like. Similarly, FIN bit 410 may include one or more bits that may be employable to close an established session and indicate that a sender has finished sending data.

The invention may also provide a capability of inserting additional information 404 into an existing packet to further reduce packets communicated over the network. In so doing, the invention may evaluate a negotiated maximum segment size (MSS) associated with packet 400. Although not shown, in one embodiment the MSS may be included within packet 400. If additional information 404 does not result in packet 400 exceeding the MSS, the invention may insert additional information 404 into packet 400 using a process such as described below in conjunction with FIG. 6.

Figure 5:
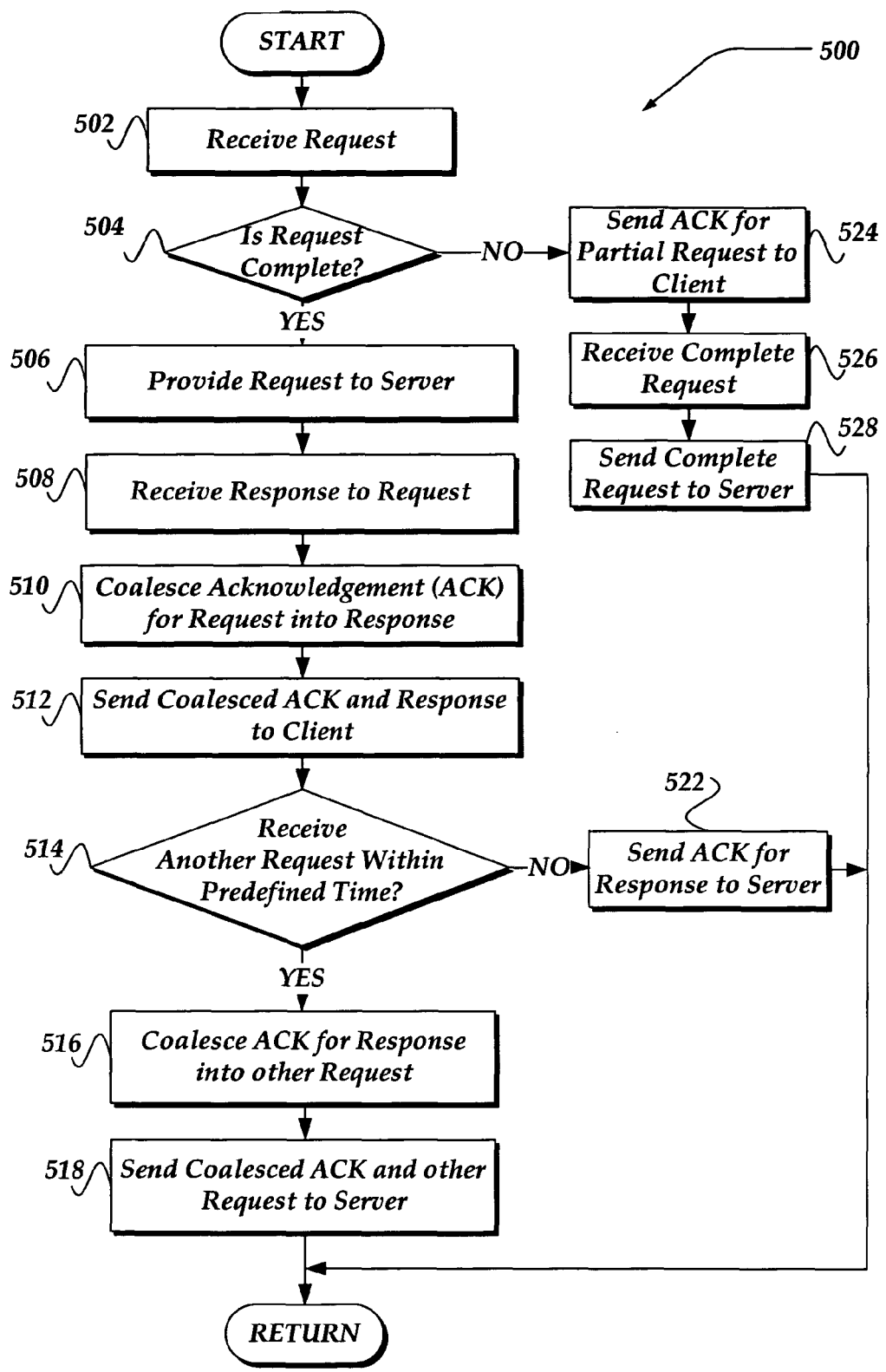
FIG. 5 illustrates a logical flow diagram generally showing one embodiment of a process for managing a network communication with coalesced protocol signals.

FIG. 5 illustrates a logical flow diagram generally showing one embodiment of a process for managing a network communication with coalesced protocol signals. Process 500 of FIG. 5 may be employed by TMD 106 of FIG. 1, for example. References to FIG. 3 are included in the following discussion to provide examples of referenced packets.

As shown, process 500 begins, after a start block, at block 502, when a request, such as request 313 is received from a client. As described above in conjunction with FIG. 3, such request may be preceded by a three-way handshake that may include an SYN, a SYN-ACK, and an ACK between the client and a TMD.

Processing continues to decision block 504, where a determination is made whether the request is substantially complete. As described above, in one embodiment, where the request is an HTTP request over TCP, the determination of a substantially complete request may be made based, at least in part, on a presence of multiple CR/LFs. However, the invention is not so limited, and other criteria and network protocols may be employed, upon which to determine when a request is substantially complete. If it is determined that the request is substantially complete, processing continues to block 506; otherwise, processing branches to block 524.

At block 506, the request may be passed to a determined server. Determination of which server to provide the request may be based on any of a variety of criteria, including a load-balancing decision, and the like. In one embodiment, the request may be modified prior to providing it to the server. Such modifications may include an address translation, a port translation, a sequence translation, and the like. In one embodiment, the modification may include additional header information, data, and the like, that may result in an increased length of data within a packet. One way to handle the increased length of data is by stretching the packet. One embodiment of a process for stretching the packet is described below in conjunction with FIG. 6.

Processing flows next to block 508, where a response, such as response 314, to the request is received from the determined server. Processing continues next to block 510, where an ACK to the request for information may be coalesced into the response packet. In one embodiment, this may include setting ACK bit 408, modifying acknowledgement number 403 to account for any length changes, and/or updating checksum 406 of packet 400 of FIG. 4. Process 500 then flows to block 512, where the ACK coalesced into the response is sent to the requesting client, as in coalesced response 315.

Processing continues next to decision block 514, where a determination is made whether another request, such as request 316, that may be provided to the determined server is received within a specified time period. In one embodiment, the other request may be received from a different client than is associated with the first response. In one embodiment, the specified time period is set to be within a minimum retransmission timeout period for the network session. In one embodiment, the specified time period may begin at about the time the coalesced response (e.g., the ACK is coalesced into the response) is sent from the TMD, such as with coalesced response 315. In another embodiment, the specified time period may begin at about the time a last packet in a multiple packet response is sent to the TMD by the server, such as with response 314. Such specified time period may be virtually any time. For example, the specified time period may be some value, such as about 100 msec, some fractional percentage of the minimum retransmission timeout period, or be based on any of a variety of other criteria, conditions, events, or the like.

If it is determined that another request 316 is received within the specified time period, then processing flows to block 516; otherwise, processing branches to block 522. At block 516, an ACK indicating receipt of the response from the server may be coalesced into the other request 316 to produce coalesced request 317. Processing flows next to block 518, where the coalesced other request 317 is sent to the server. Processing then returns to a calling process to perform other actions.

Back at block 522, if another request is not received from the client within about the specified time period, then a distinct ACK packet (not illustrated in FIG. 3) may be provided to the determined server. Processing then returns to the calling process to perform other actions.

Back at decision block 504, if it is determined that the prior request is incomplete, processing flows to block 524, where an ACK (not illustrated) may be provided to the client for the received partial request. Processing may then flow to block 526, where the partial request may be buffered until the request is determined to be complete. In addition, although not illustrated, ACKs may be provided for each additional portion of the request that is received, until the request is determined to be substantially complete, where upon the process flows to block 528 to provide the substantially complete request to the determined server. Processing then returns to the calling process to perform other actions.

Figure 6:
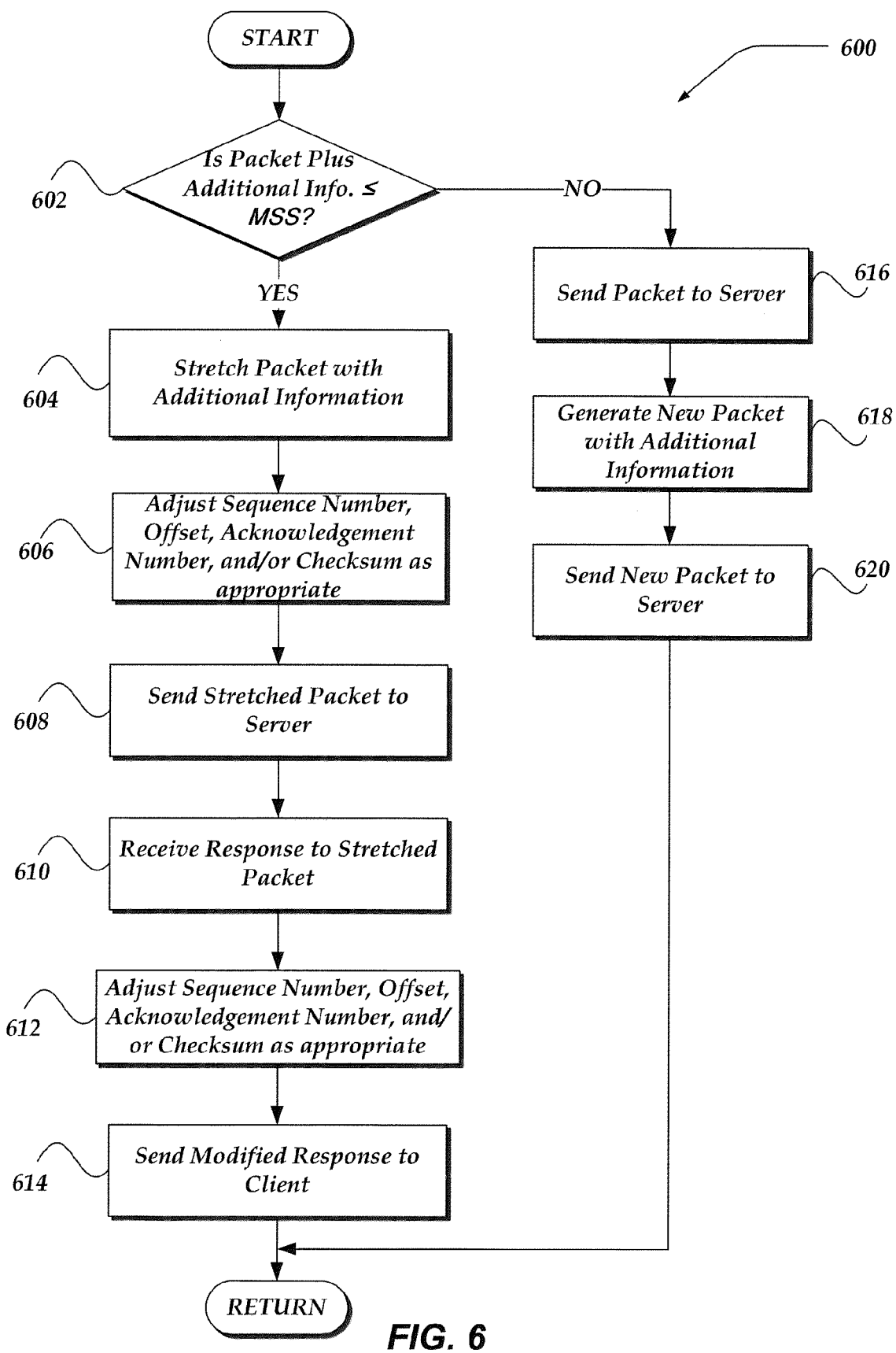
FIG. 6 illustrates a logical flow diagram generally showing one embodiment of a process for managing a network communication with packet stretching, in accordance with the present invention.

FIG. 6 illustrates a logical flow diagram generally showing one embodiment of a process for managing a network communication with packet stretching, in accordance with the present invention. Packet stretching is directed towards reducing the number of packets transmitted over the network by inserting additional information within an existing packet, such as a request packet, a response packet, or the like. For simplicity, process 600 illustrates the packet to be from a client destined for a server. However, the invention is not so limited. For example, process 600 may be appropriately modified to illustrate a flow of packets from a server to a client, without departing from the scope or spirit of the invention.

Moreover, the additional information to be inserted may include any of a variety of information, including, but not limited to providing a client IP address, a keepalive, header information, or the like. Process 600 of FIG. 6 may, for example, be used within TMD 106 of FIG. 6.

Process 600 begins, after a start block, at decision block 602, where a determination is made whether a combined size of a received packet plus the additional information to be inserted into the packet is within a negotiated MSS. If it is determined that the combined size is within the negotiated MSS, processing flows to block 604; otherwise, processing branches to block 616.

At block 604, the additional information is inserted into the received packet, often resulting in the size of the overall received packet to increase, e.g., become stretched. Processing then flows to block 606, where those components within the packet that may be affected by a change in the packet size are adjusted. Such components may include a sequence number, an offset, an acknowledgement number, a checksum, or the like. Processing then flows to block 608, where the stretched packet is sent towards the server.

Processing flows next to block 610, where a response to the stretched packet is received. Processing then continues to block 612, where the response may be adjusted to remove an effect due to the stretching of the request packet. Such adjustments may include adjusting the sequence number, offset, acknowledgement number, checksum, or the like. The modified response packet may then be sent to the client at block 614. Process 600 then may return to a calling process to perform other actions.

Back at decision block 602, if it is determined that the combined received packet plus the additional information to be inserted into a packet exceeds the negotiated MSS, processing flows to block 616, where the received packet is sent to the server, without being stretched. Processing continues to blocks 618 and 620, where a new packet may be generated for the additional information, and sent to the server. Processing then may return to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a communication over a network, comprising:
   a transceiver for receiving and sending packets to a client and a server; and
   a management component that is within the network device, the network device being interposed between the client and the server, and wherein the management component is programmed to perform actions comprising:
      receiving, from the server, a response to a first request from the client;
      receiving, a second request, wherein the second request is received absent an acknowledgement (ACK) to the response; and
      selectively coalescing, by the network device, the acknowledgement (ACK) to the response within the second request, wherein the second request is a Hypertext protocol Transfer protocol (HTTP) request; and
      forwarding the second request with the ACK to the server.

2. The network device of claim 1, wherein the actions further comprise:
   determining whether the second request is received within a timeout period, and wherein selectively coalescing the acknowledgement is based on whether the second request is received within the timeout period.

3. The network device of claim 2, wherein the timeout period is based on a minimum retransmission timeout period.

4. The network device of claim 2, further comprising
   if the second request is received after the timeout period, sending an ACK to the response to the server separate from forwarding the second request to the server.

5. The network device of claim 1, wherein the management component being programmed to perform actions, further comprising:
   receiving at the network device a separate ACK to the response from the client; and
   employing the separate ACK as the ACK that is selectively coalesced with the second request that is forwarded to the server.

6. The network device of claim 1, wherein the actions further comprise:
   coalescing a finish (FIN) flag into a last portion of a final response from the server, and sending the coalesced last portion of the final response to the client, wherein the final response is received at the network device separate from the FIN flag.

7. The network device of claim 1, wherein the first request comprises a first application layer request using a first protocol and the second request comprises a second application layer request using a second protocol different from the first protocol.

8. The network device of claim 1, wherein the actions further comprise:
   if the ACK is coalesced within the second request, selectively stretching at least one packet of the second request to an increased length, based on whether the increased length is within a maximum segment size (MSS).

9. The network device of claim 1, wherein coalescing the ACK further comprises adjusting at least one of an acknowledgement number and an offset associated with the request.

10. The network device of claim 1, wherein the actions further comprise:
    if the ACK is coalesced within the second request and additional information is to be sent to the client, determining if a combination of the additional information and the response from the server are within a maximum segment size (MSS), and if it is, stretching the response from the client by inserting the additional information into the response, and sending the stretched response to the server.

11. The network device of claim 1, wherein the second request is received from another client.

12. The network device of claim 1, wherein the network device is configured to operate as at least one of a router, proxy, firewall, load balancer, cache device, gateway, a network address translator, port translator, a sequence translator, or a traffic management device.

13. The network device of claim 1, wherein the actions further comprise:
    performing a three-way handshake with the client prior to receiving the first request from the client.

14. The network device of claim 13, wherein performing the three-way handshake further comprises employing at least one of a SYN cookie or a SYN cache mechanism.

15. A network device for managing a communication over a network, comprising:
    a transceiver for receiving and sending packets to a client and a server; and
    a management component that is within the network device, the network device being interposed between the client and the server, and wherein the management component is programmed to perform actions comprising:
       receiving, from the server, a response to a first request from the client;
       receiving, a second request, wherein the second request is received absent an acknowledgement (ACK) to the response; and
       selectively coalescing, by the network device, the acknowledgement (ACK) to the response within the second request;
       forwarding the second request with the ACK to the server, wherein the first request comprises an HyperText Transfer Protocol (HTTP) request;
       parsing the HTTP request;
       selectively coalescing a request ACK with the response, based on the parsing of the HTTP request; and
       forwarding the response to the client.

16. A method of managing a communication between a client and a server over a network, comprising:
    performing a three-way handshake with the client to establish a session;
    receiving a request from the client by a network device interposed between the client and the server;
    forwarding the request to the server;

receiving a separate acknowledgement (ACK) to the request from the server;
receiving a response to the request from the server;
selectively coalescing an acknowledgement (ACK) to the request into the response, wherein the request is a HyperText Transfer Protocol (HTTP) request; and
forwarding the response to the client.

17. The method of claim 16, wherein performing the three-way handshake further comprises employing at least one of a SYN cookie or a SYN cache mechanism across a wide area network.

18. The method of claim 16, further comprising:
if another request that is to be sent to the server is received within a specified time period, coalescing another ACK into the other request, and sending the other request to the server.

19. The method of claim 18, wherein the other request is received from another client.

20. The method of claim 18, further comprising
if the other request destined to be sent to the server is received after the specified time period, sending the other ACK to the response to the server separate from sending the other request to the server.

21. The method of claim 18, wherein at least one of a address translation, a port translation, or a sequence translation is performed on at least one of the request, the response, or the other response.

22. The method of claim 18, wherein the specified time period is based on a minimum retransmission timeout.

23. The method of claim 16, further comprising
coalescing a finish (FIN) flag into at least a portion of a final response from the server, and sending the coalesced FIN and at least the portion of the final response to the client.

24. The method of claim 16, further comprising:
if additional information is to be sent to the server
determining if a combination of the additional information and the request from the client are within a maximum segment size (MSS), and if it is, stretching the request from the client by inserting the additional information into the request, adjusting at least one of an acknowledgement number and an internal offset, and sending the stretched request to the server.

25. The method of claim 16, further comprising parsing the content of the request and determining whether the request is complete, and wherein selectively coalescing the acknowledgement is based on whether the request is complete.

26. The method of claim 16, further comprising parsing the HTTP request and determining whether the HTTP request is complete, and wherein selectively coalescing the acknowledgement is based on whether the HTTP request is complete.

27. The method of claim 16, further comprising determining whether the response is received within a timeout period, and wherein selectively coalescing the acknowledgement is based on whether the response is received within the timeout period.

28. The method of claim 16, wherein selectively coalescing the acknowledgement into the response further comprises:
parsing application layer content within the request and determining whether the request is complete; and
if the request is complete, determining whether the reply is received within a timeout period and selectively coalescing the acknowledgement based on whether the reply is received within the timeout period.

29. A method of managing a communication between a client and a server over a network, comprising:
performing a three-way handshake with the client to establish a session;
receiving a request from the client by a network device interposed between the client and the server;
forwarding the request to the server;
receiving a separate acknowledgement (ACK) to the request from the server;
receiving a response to the request from the server;
selectively coalescing an acknowledgement (ACK) to the request into the response;
forwarding the response to the client; and
if another request that is to be sent to the server is received within a specified time period, coalescing another ACK into the other request, and sending the other request to the server, wherein at least one of the request and the other request comprises a HyperText Transfer Protocol (HTTP) request.

30. A computer-readable non-transitory storage medium having computer-executable instructions, the computer-executable instructions when installed onto a traffic management device (TMD) that is interposed between a client and a server enable the TMD to perform actions, comprising:
receiving a request at the TMD from the client;
sending the request from the TMD to the server;
receiving an acknowledgement (ACK) from the server to the request;
receiving, separate from the ACK, a response to the request, at the TMD, from the server;
coalescing at the TMD the ACK to the request into the response;
sending by the TMD the coalesced response to the client; and
if another request is received within a specified time period, coalescing at the TMD another ACK to the response into the other request, and sending by the TMD the coalesced other request to the server, wherein the other request was received by the TMD absent the other ACK: wherein at least one of the request and the other request comprises an HTTP request.

31. The computer-readable storage medium of claim 30, further comprising:
if additional information is to be sent towards the server:
determining at the TMD if a combination of the additional information and the request from the client are within a maximum segment size (MSS), and if it is, stretching at the TMD the request from the client by inserting the additional information into the request, and sending by the TMD the stretched request to the server.

32. A traffic management device for managing a HTTP communication between a client and a server connection, comprising:
a transceiver to exchange HTTP data between the client and the server; and
a processor programmed to perform actions including:
receiving a request from the client;
sending the request to the server;
receiving a response to the request from the server, wherein the response is received absent an acknowledgement (ACK) to the request;
coalescing an ACK to the request into the response;
sending the coalesced response and ACK to the client; and
if another request is received within a specified time period and wherein the other request is received absent an ACK, coalescing another ACK to the response into the other request, and sending the coalesced other request and ACK to the server, wherein at least one of the request and the other request comprises an HTTP request.

33. The traffic management device of claim 32, wherein the actions further comprise:
if additional information is to be sent to the server:
determining if a combination of the additional information and the request from the client are within a maximum segment size (MSS), and if it is, stretching the request from the client by inserting the additional information into the request, adjusting at least one of an acknowledgement number, an offset, and a checksum associated with the request, and sending the stretched request to the server.

34. A network device that forwards packets between a first device and a second device, comprising a component that is programmed to perform actions comprising:
performing a three-way handshake with the first device to establish a session with the first device;
receiving a first packet from the first device;
determining whether a second packet that is to be sent to the first device is received within a timeout period, based on a temporal relation between receiving the first packet and receiving the second packet, wherein the second packet has an unset acknowledgment for the first packet;
if the determining is affirmative, modifying the second packet to be an acknowledgement of the first packet and forwarding the second packet to the first device; and
if the determining is negative, sending an acknowledgement of the first packet in a third packet to the first device.

35. The network device of claim 34, wherein the first device is a client device and the second device is a server.

36. The network device of claim 34, wherein the first device is a server and the second device is a client device.

37. The network device of claim 34, wherein the actions further comprise:
determining the timeout period based on a minimum retransmission timeout of a network session.

38. The network device of claim 34, wherein the actions further comprise forwarding the first packet to the second device, and receiving the second packet from a third device.

39. The network device of claim 34, wherein the first device is a server, the second device is a client device, and the second packet is received from a third device.

40. The network device of claim 34, wherein the first device is a client device and the second device is a server, and wherein the actions further comprise:
determining whether a third packet that is to be sent to the second device is received within a second timeout period;
if the determining of the third packet is affirmative, setting an ACK bit in the third packet and forwarding the third packet to the second device; and
if the determining of the third packet is negative, sending an acknowledgement in a fourth packet to the second device.

41. The network device of claim 34, wherein the actions further comprise:
if the determining is positive, increasing the length of the second packet.

42. The network device of claim 34, wherein performing the three-way handshake further comprises employing at least one of a SYN cookie or a SYN cache.

43. A network device that forwards packets between a client and a server, comprising a component that is programmed to perform actions comprising:

receiving a request packet containing at least a portion of an HTTP request from the client;
parsing the request packet to determine whether it includes a complete HTTP request;
forwarding the HTTP request to the server;
receiving a response from the server, wherein the response has an unset acknowledgment for the HTTP request; and
determining when to send an acknowledgement to the client based on whether the request packet includes a complete HTTP request.

44. The network device of claim 43, wherein the actions further comprise:
if the request packet includes the complete HTTP request, receiving the response from the server prior to sending the acknowledgement to the client.

45. The network device of claim 43, wherein the actions further comprise:
selectively coalescing an ACK with the response from the server based on whether the request packet includes the complete HTTP request.

46. The network device of claim 43, wherein the actions further comprise:
selectively coalescing an ACK with the response from the server based on whether the request packet includes the complete HTTP request and whether the response is received within a timeout period.

47. A network device that forwards packets between a client and a server, comprising a component that is programmed to perform actions comprising:
receiving a request packet containing at least a portion of an HTTP request from the client;
parsing the request packet to determine whether it includes a complete HTTP request;
forwarding the HTTP request to the server;
receiving a response from the server, wherein the response is received absent an acknowledgement to the HTTP request; and
determining when to send an acknowledgement to the client based on whether the request packet includes a complete HTTP request; and
if the request packet includes the complete HTTP request, forwarding the HTTP request to the server prior to sending the acknowledgement to the client.

48. A method of managing a communication over a network comprising:
receiving, from a server, a first message for a first client;
forwarding the first message to the first client;
receiving, from either the first client or a second client, a second message wherein the second message includes an unset ACK bit; and
selectively setting an ACK bit within the second message and forwarding the modified second message to the server, based on a temporal relation between receiving the first message and receiving the second message and wherein the set ACK bit is associated with the first message.

49. A traffic management device for managing a communication between at least one client and at least one server, comprising:
a transceiver that receives packets from the at least one client and the at least one server and sends packets to the at least one client and the at least one server;
a module that forwards packets from the at least one client to the at least one server, and forwards packets from the at least one server to the at least one client;
means for sending an acknowledgement to a server of the at least one server, based on a temporal relation between a first packet received from the server and a second packet received from the at least one client wherein the second packet received from the at least one client is received with an unset acknowledgement bit set.

50. The traffic management device of claim 49, wherein the means for sending an acknowledgement selectively coalesces an ACK into the second packet based on whether the second packet is received within a specified timeout period of receiving the first packet.

51. The traffic management device of claim 49, further comprising:
    means for sending an acknowledgment to the client, based on a temporal relation between the second packet and a third packet received from the server.

52. The traffic management device of claim 49, further comprising:
    a parsing module that parses the second packet to determine whether a request within the second packet is complete; and
    means for sending an acknowledgment to the client, based on the results of parsing the second packet and based on a temporal relation between the second packet and a third packet received from the server.

53. A traffic management device for managing a communication between at least one client and at least one server, comprising:
    a transceiver that receives packets from the at least one client and the at least one server and sends packets to the at least one client and the at least one server;
    a module that forwards packets from the at least one client to the at least one server, and forwards packets from the at least one server to the at least one client;
    means for sending an acknowledgement to a client of the at least one client, based on a temporal relation between a first packet received from the client and a second packet received from a server of the at least one server wherein the second packet received from the server is received absent an acknowledgement within being set for the first packet.

54. The traffic management device of claim 53, further comprising:
    a parsing module that parses the first packet to determine whether a request within the first packet is complete; and
    wherein the means for sending an acknowledgment to the client is further based on the results of parsing the first packet.

55. The traffic management device of claim 53, wherein the means for sending an acknowledgement selectively coalesces an ACK into the second packet based on whether the second packet is received within a specified timeout period of receiving the first packet.

56. The traffic management device of claim 53, further comprising:
    a parsing module that parses the first packet to determine whether a request within the first packet is complete; and
    means for selectively coalescing a TCP FIN with the second packet and forwarding the resultant packet to the client, wherein the means for sending an acknowledgment to the client is further based on the results of parsing the first packet.

\* \* \* \* \*